United States Patent [19]

Franklin

[11] Patent Number: 4,649,740
[45] Date of Patent: Mar. 17, 1987

[54] APPARATUS FOR AND METHOD OF TESTING FOR LEAKS IN PACKAGES

[75] Inventor: Kenneth W. Franklin, Knightcote near Leamington Spa, England

[73] Assignee: Bishopbarn Limited, Leamington Spa, England

[21] Appl. No.: 839,096

[22] Filed: Mar. 13, 1986

[30] Foreign Application Priority Data

Mar. 13, 1985 [GB] United Kingdom ............... 8506443

[51] Int. Cl.$^4$ .......................................... G01M 3/36
[52] U.S. Cl. .......................................... 73/49.3; 73/52; 73/45.4
[58] Field of Search ............... 73/49.3, 45.4, 45.1, 73/52

[56] References Cited

U.S. PATENT DOCUMENTS

| | | | |
|---|---|---|---|
| 3,751,972 | 8/1973 | Hass | 73/45.4 |
| 3,918,293 | 11/1975 | Feigel | 73/52 |
| 4,024,956 | 5/1977 | Cassidy | 73/52 |
| 4,510,730 | 4/1985 | Edmondson | 73/49.3 |
| 4,517,827 | 5/1985 | Tapscott | 73/49.3 |

FOREIGN PATENT DOCUMENTS 2059381 4/1981 United Kingdom .

Primary Examiner—Michael J. Tokar
Assistant Examiner—Hezron E. Williams
Attorney, Agent, or Firm—Solon B. Kemon

[57] ABSTRACT

Apparatus for testing for leaks in a flexible package containing loosely packaged product and some air includes a first set of gravitational probes at a first measuring station for applying a load to the package and obtaining a first measure of the thickness of the package under this load, a second set of gravitational probes at a second measuring station for applying a corresponding load to the package in a corresponding position and direction with respect to the package and obtaining a second measure of the thickness of the package under the second load and means for comparing the first and second measures of thickness and for indicating the presence of a leak when the second measure is substantially less than the first.

14 Claims, 2 Drawing Figures

APPARATUS FOR AND METHOD OF TESTING FOR LEAKS IN PACKAGES

BACKGROUND OF THE INVENTION

The invention relates to apparatus for and methods of testing for leaks in flexible packages containing loosely packaged product and some air.

The packages with which the invention is concerned are for example potato crisp packs in the form of a sealed bag having two opposite rectangular faces, the bag containing the potato crisps and also some air which tends to prevent undue collapse of the bag. Other kinds of products are packages in similar bags and as will be evident, the invention could also be applied to packages for other products.

In the packaging of potato crisps, there is some tendency to produce some packages which have an unacceptably large air leak, possibly by being inefficiently sealed or completely unclosed. These sub-standard packages tend to occur at random amongst satisfactory packages and if the packaging apparatus has to be stopped every time a sub-standard package is detected, the output of the packaging apparatus is reduced. It is also disadvantageous to fail to detect sub-standard packages because these can eventually lead to customer complaints.

It has already been proposed in our published UK Patent Application No. 2138150-A to provide apparatus for testing for leaks in such a package in which a plurality of probes engage against one face of the package under the influence of gravity at successive probing stations. This action tends to expel air from a leaky package. At the last of these stations, a measure of the thickness of the package is obtained by obtaining a measure of the position of certain probes. This measured information indicates whether or not there is a leak in a package.

With our earlier proposal, it is necessary for each kind of package with which the apparatus may be used to establish in advance an appropriate thickness for determining whether a package is or is not satisfactory. With packaging apparatus of this kind, it is often desirable to change over from one size of package to another or from one packaged product to another and it is desirable to be able to do this with a minimum of adjustments in the packaging equipment. For these reasons it would be desirable to provide a bag testing apparatus in which it is not necessary to re-set the measure of a satisfactory package when changing from one kind of package to another.

SUMMARY OF THE INVENTION

According to one aspect of the invention there is provided apparatus for testing for leaks in a flexible package containing loosely packaged product and some air including first means for applying a load to the package and obtaining a first measure of the thickness of the package under this load, second means for applying a corresponding load to the package in a corresponding position and direction with respect to the package and obtaining a second measure of the thickness of the package under the second load and means for comparing the first and second measures of thickness and for indicating the presence of a leak when the second measure is substantially less than the first. Thus, with the present invention, the minimum effective thickness for a satisfactory package under the second load is pre-determined by the measure of the thickness of the package under the first load.

Each of the means for applying a load may be a gravitational probe. The measure of the thickness of the package may be obtained by measuring the displacement of the respective probe from a datum to its loading position. Further probes may be arranged to apply loads to the package simultaneously but each measure of thickness is preferably obtained by the displacement of one probe only. For example, there may be nine probes arranged in a three-by-three matrix, the displacement being measured at the central probe.

A preliminary means may be provided for applying a load to the package prior to said first means and this preliminary means may incorporate only a single probe at a position corresponding to that of the probe giving a measure of thickness.

The apparatus may be provided with at least one intermediate means for applying a load to the package between the first and second means. The preliminary means would be intended to cause the packaged product to settle down within its package so that for example a single potato crisp standing on edge at the first measurement does not give an unrealistic thick measure. The intermediate means for applying a load gives further opportunities beyond the effect of the probe or probes during the second measurement to expel air through a leak.

The invention also extends to a method of testing for leaks in a flexible package containing loosely packaged product and some air including the steps of applying a first load to a package, obtaining a first measure of the thickness of the package under this load, subsequently applying a second load to the package and obtaining a second measure of the thickness of the package, comparing said first and second measures and indicating whether the second measure is substantially less than the first to provide an indication of leakage from the package.

BRIEF DESCRIPTION OF THE DRAWINGS

An embodiment of the invention will be described with reference to the accompanying drawings in which.

DESCRIPTION OF PREFERRED EMBODIMENTS

Figure 1:
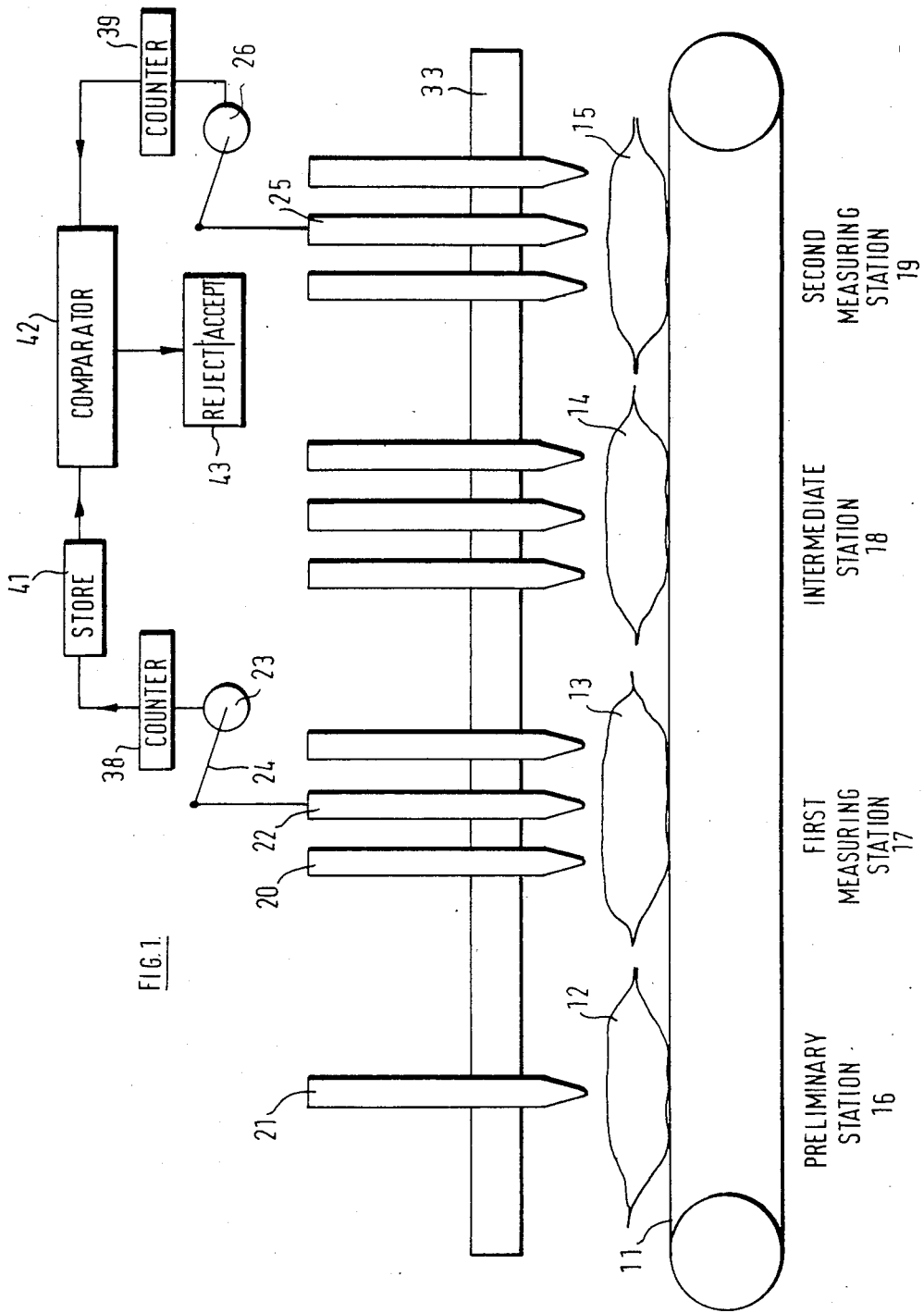
FIG. 1 is a diagrammatic side elevation of an apparatus according to the invention.

FIG. 1 shows conveyor 11 arranged to convey packs of crisps such as 12, 13, 14 and 15 along the conveyor between positions which will be referred to in sequence as a preliminary station 16, a first measuring station 17, an intermediate station 18 and a second measuring station 19. The four stations are equally spaced along the conveyor and the conveyor is arranged to index in steps equivalent to this spacing so that the individual packages come to rest in turn at each station. The conveyor is conveniently a belt conveyor with a provision for suction to hold the bags down on to the belt to ensure accurate indexing even when the conveyor is accelerated and retarded suddenly during the indexing movements. A conveyor of this kind is described in greater detail in our published UK Patent Application No. 2128953A.

At the preliminary station a single gravitational probe 21 is arranged (in a manner to be described with reference to FIG. 2) to be raised and lowered so that it can drop down on to the central region of the crisp package 12 shown at this station and can act similarly on successive crisp packages as they are indexed through the station.

The first measuring station 17 incorporates a series of nine gravitational probes similarly arranged to be raised and lowered. The probes are arranged in a three-by-three matrix with the result that only three of the probes are shown in the side elevation. The eight peripheral probes at the first measuring station correspond exactly with the probe 21 at the preliminary station. A central measuring probe 22 is similar to the other probes but incorporates an upward extension for coupling to a transducer such as a rotary encoder 23 through an arm 24. The encoder 23 gives a measure of the position of the probe 22 as it is resting on the crisp package 13 by measuring displacement of the probe 22 between a datum position (to be explained later with reference to FIG. 2) and the position shown in contact with a crisp package.

The intermediate station 18 corresponds in most respects to the first measuring station 17 in that it incorporates a three-by-three matrix of nine probes for engagement with a crisp package. However, the measuring equipment incorporating the encoder 23 is omitted from the intermediate station.

The second measuring station 19 corresponds exactly with the first measuring station 17, incorporating a central measuring probe 25 coupled to an encoder 26.

Figure 2:
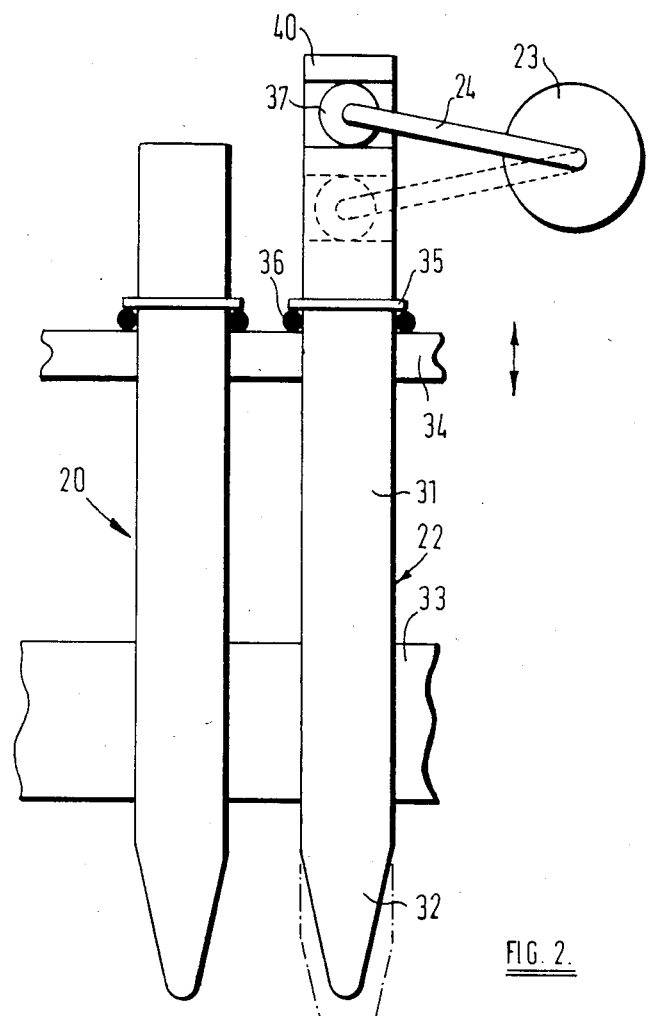
FIG. 2 shows further details of one probe and its installation.

By way of example, FIG. 2 shows the measuring probe 22 from the first measuring station and one other probe 20 at the same measuring station. All of the probes other than the measuring probe correspond to probe 20 and both measuring probes 22 and 25 correspond to each other as shown for the measuring probe 22 in FIG. 2.

Each probe is constituted primarily by a cylindrical steel rod 31 which is tapered at its lower end and terminates in a rounded nose 32 intended for engagement with a package. All 28 probes from the four stations slide freely up and down in a fixed guide 33 extending along the length of the four stations and fixed to the frame of the apparatus. A lifting beam 34 also extends along the whole length of the four stations and is arranged to be guided for vertical movement and lifted up and down in sequence with the indexing of the conveyor. Each probe passes through the lifting beam and is free to slide with respect to it. Each probe has a collar 35 just above the lifting beam. The collar may conveniently be formed by a circlip engaged in a groove in the rod forming the probe. An elastomeric O-ring 36 is arranged immediately below each collar 35. In use, to lift each probe to allow a package to be moved under it, the lifting beam 34 is raised. The beam engages the O-rings which act as buffers and then raises up all of the probes. When a package has been positioned under a raised probe or matrix of probes, the lifting beam is lowered again and any probe in contact with a crisp package rests on the crisp package with its collar 35 and O-ring buffer 36 clear of the lifting beam 34.

For probe 22, an upward extension 40 is arranged to engage against a roller 37 carried on arm 24. The roller 37 is arranged to move vertically up and down with its associated probe, possibly by very light spring loading on the probe or possibly by inserting the roller in an aperture in the probe which confines the roller vertically. Arm 24 is connected to an encoder 23 which is arranged to provide a measure of the position of the probe 22. For example, a datum position may be defined by a probe supported on the lifting beam at the upper end of its stroke. The encoder is arranged to provide an electrical signal pulse for every few degrees of angular movement of the arm 24. By matching the arm 24 to the encoder, it is possible to provide one pulse for approximately 1.5 millimeters of vertical travel of the probe. By counting the number of pulses from the encoder between its datum position and the actual position of the probe when resting on a package, a measure of the position of the probe and thus of the effective thickness of the package under load is obtained.

All of the probes have substantially equal weights. The weights of the measuring probes 22 and 25 may vary slightly from those of the other probes due to their measuring function but the weight of probe 22 is equal to that of probe 25. In this way the load exerted by the probes on a package at the first measuring station 17 corresponds to the load exerted by the probes on a package at the second measuring station 19 and in the absence of other variables both sets of probes should settle on a package at the same height.

The operation of the apparatus will now be described with reference to FIG. 1. A package fed in to the apparatus first arrives at the preliminary station 16. While it is stationary at this station, the lifting beam 34 (FIG. 2) is lowered to lower the probe 21 on to the centre of the package. This load tends to settle down any contents of the package which are standing on edge or otherwise give a false impression of thickness of the package. Probe 21 is then raised again and the package is indexed to the first measuring station. All nine probes are lowered simultaneously on to the package and a measure is obtained from the central measuring probe 22 of the effective thickness of the package at this stage. This measure may for example be measured by a counter 38 associated with encoder 23. The probes are raised again by the lifting beam and the package is indexed to the position shown for package 14 at the intermediate station 18. The probes of the intermediate station are lowered on to the package and tend to expel air from leaks in the package. The probes are then raised again.

The package is then indexed to the second measuring station 19 where it takes up the position shown for package 15. As with the first measuring station, the probes are lowered on to the package and a measure is obtained of the thickness of the package by measuring the displacement of the central probe 25 through encoder 26 and storing the corresponding count in a counter 39.

The indexing action and raising and lowering of the probes continues in sequence with successive crisp packages passing through the machine. Thus, in the absence of any blank spaces, probing action occurs at all four stations simultaneously but on successive packages.

The count obtained from the first measuring station is stored in a storage unit 41 or otherwise delayed for two indexing steps of the apparatus. The count from the first measuring station and that from the second measuring station for the same package are then compared with each other in comparator 42. For a package to be satisfactory, the measure of thickness obtained at the second measuring station should be equal to or only slightly less than the measure of thickness obtained at the first measuring station. The output from the comparator is arranged to indicate when a package is unsatisfactory so that it can be rejected. Although various logic blocks such as the comparator have been shown as discrete components, it should be understood that the comparison may be made in a computer in which the counting, storage, comparison and interpretation of the comparator output are all effected in a software mode in which case there is no readily identifiable hardware unit identifying the comparator or other parts of the equipment.

When the nature of the package to be tested is changed, for example by changing to a larger sized package or a package of a different product, there is no requirement for re-setting of the probe position indicative of a satisfactory package because the required position of the probe 25 is pre-set by the actual measured value of the probe 22.

Whilst the preliminary station with its single probe is highly desirable and tends to improve the reliability of the apparatus, useful results can be achieved if the preliminary station is omitted. Similarly, because the probes at the second measuring station cause a package to deflate and thus become less thick, it is possible to detect a leaking package without the presence of the intermediate station. However, the intermediate station gives further opportunity for deflation of a package under load and so is useful in enabling the apparatus to detect relatively small leaks.

The apparatus could be modified so that the probes bear on the the packages by some means other than gravity so long as the loads of the probes at the first and second measuring stations correspond with each other.

I claim:

1. Apparatus for testing for leaks in a flexible package containing loosely packaged product and some air including first means for applying a load to the package and obtaining a first measure of the thickness of the package under this load, second means for applying a corresponding load to the package in a corresponding position and direction with respect to the package and obtaining a second measure of the thickness of the package under the second load and means for comparing the first and second measures of thickness and for indicating the presence of a leak when the second measure is substantially less than the first.

2. Apparatus according to claim 1 wherein each means for applying a load is a gravitational probe.

3. Apparatus according to claim 2 wherein each measure of the thickness of the package is obtained by measuring the displacement of the respective probe from a datum to its loading position.

4. Apparatus according to claim 2 wherein further probes are arranged to apply loads to the package simultaneously but each measure of thickness is obtained by the displacement of one probe only of the probes.

5. Apparatus according to claim 2 wherein nine probes are arranged in a three-by-three matrix to apply loads to the package simultaneously but each measure of thickness is obtained by the displacement of the central probe.

6. Apparatus according to claim 1 further comprising a preliminary means for applying a load to the package prior to said first means.

7. Apparatus according to claim 6 wherein said preliminary means incorporates only a single probe at a position corresponding to that of the probe giving a measure of thickness.

8. Apparatus according to claim 1 further comprising at least one intermediate means for applying a load to the package between said first and said second means.

9. Apparatus according to claim 8 wherein the intermediate means comprises a three-by-three matrix of nine probes.

10. Apparatus according to claim 1 wherein said first means and said second means are arranged in sequence along a conveyor and each package is indexed to each of said means in turn by the conveyor.

11. Apparatus according to claim 1 wherein each means for obtaining a measure of the displacement of each means for applying a load is a digital encoder.

12. A method of testing for leaks in a flexible package containing loosely packaged product and some air including the steps of applying a first load to a package, obtaining a first measure of the thickness of the package under this load, subsequently applying a second load to the package and obtaining a second measure of the thickness of the package, comparing said first and second measures and indicating whether the second measure is substantially less than the first to provide an indication of leakage from the package.

13. A method of testing according to claim 12 including applying a preliminary load to the package prior to applying said first load and obtaining said first measure.

14. A method of testing according to claim 12 including applying at least one intermediate load to the package after applying said first load and obtaining said first measure but prior to applying said second load and obtaining said second measure.

* * * * *